US007275017B2

(12) United States Patent
Dini et al.

(10) Patent No.: US 7,275,017 B2
(45) Date of Patent: Sep. 25, 2007

(54) METHOD AND APPARATUS FOR GENERATING DIAGNOSES OF NETWORK PROBLEMS

(75) Inventors: Petre Dini, San Jose, CA (US); Chris Riggins, Pleasanton, CA (US); Manuela I. Popescu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 10/965,413

(22) Filed: Oct. 13, 2004

(65) Prior Publication Data

US 2006/0123278 A1 Jun. 8, 2006

(51) Int. Cl.
*G06F 13/14* (2006.01)
(52) U.S. Cl. ...................... 702/182; 702/183; 702/186; 702/188
(58) Field of Classification Search .................. 702/58, 702/59, 108, 181, 182, 189, 183, 188; 705/2; 706/60; 709/224; 718/101, 102; 719/328
See application file for complete search history.

(56) References Cited

U.S. PATENT DOCUMENTS

| | | | | |
|---|---|---|---|---|
| 6,260,035 B1 * | 7/2001 | Horvitz et al. | ................. | 706/60 |
| 6,529,954 B1 * | 3/2003 | Cookmeyer et al. | ........ | 709/224 |
| 6,633,835 B1 * | 10/2003 | Moran et al. | ................ | 702/190 |
| 7,020,882 B1 * | 3/2006 | Lewallen | .................... | 719/328 |
| 7,155,719 B2 * | 12/2006 | Danan | ........................ | 718/102 |

OTHER PUBLICATIONS

EMC, "EMC Smarts Service Assurance Solutions," Data Sheet S0019, EMC Corporation, 2005, 9 pages.
Hewlett-Packard, "HP OpenView TeMIP Product Family 5," data sheet 5982-9706EN, Rev. 1, May 2005, located on the internet at <http://www.managementsoftware.hp.com/products/tmp/ds/tmp_ds.pdf>, 8 pages.
MICROMUSE, "Netcool/Precision Product Family—Realtime Network Discovery, Asset Discovery, and Fault Management," Product Family Sheet, 2004, located at <http://www.micromuse.com/downloads/pdf_lit/PF_Precision.pdf>, 4 pages.

* cited by examiner

*Primary Examiner*—Marc S. Hoff
*Assistant Examiner*—Felix Suarez
(74) *Attorney, Agent, or Firm*—Hickman Palermo Truong & Becker LLP

(57) ABSTRACT

A method is disclosed for network knowledge-based diagnosis comprising the machine-implemented steps of creating and storing one or more symptoms, wherein each symptom comprises a set of information elements that represent one or more network events that may be potentially received from a computer network; associating a weight value with each information element of the one or more symptoms; associating a confidence time interval value with each of the one or more symptoms; receiving one or more network events from elements in the computer network; and determining a set of one or more candidate diagnoses of a problem indicated by the received network events, by (a) selecting one or more symptoms that include at least one of the received network events and (b) using functions that map the selected symptoms to one or more candidate diagnoses, based on all weight values of events in the selected symptoms and the confidence time interval values of the selected symptoms.

21 Claims, 8 Drawing Sheets

METHOD AND APPARATUS FOR GENERATING DIAGNOSES OF NETWORK PROBLEMS

FIELD OF THE INVENTION

The present invention generally relates to computer network management. The invention relates more specifically to methods for determining problems in networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network administrators need effective tools for determining what problems have occurred in computer networks, especially large, complex networks of the type owned and operated by service providers. Many existing solutions for event correlation and generating network diagnostics are not suitable for real-time monitoring and on-line diagnosis, because they require complex computational models and are computationally expensive. Operation support systems (OSS) commonly incorporate topology models and event models that add to the computational costs, which can lengthen the time for the OSS to provide feedback to an administrator, increasing the time at which corrective action is taken.

Further, many existing systems inadequately track event information structures that are communicated by network elements. For example, a network element may emit multiple events associated with a single problem, but due to routing complexities and network latency, the events arrive at the OSS at different times or out of order. Accounting for temporal dependencies and considering event reordering issues imposes challenging responsibilities on such systems. In a typical approach, when an OSS receives one event, a plurality of problem diagnoses may be possible, and the OSS determines a single diagnosis only when a specified set of events arrives in a specified order. Thus, a single event {e1} may lead to numerous diagnoses, while a full set {e1, e2, e3, e4} precisely identifies the faulty element. Until the full set of events is received, the OSS cannot be used to isolate a network problem.

The failure of these systems to keep track of temporal dependencies and appropriately handle event reordering is one of the main reasons for developing customized event correlation in an OSS. Solutions that do not require complex or rich models and provide a lightweight implementation, potentially suitable for implementation inside the network element, are better.

Further, the geographic distribution of network elements in a network may introduce a variable delay, making the accuracy of event patterns that are tightly related to time particularly inappropriate for real-time monitoring and diagnosis. In networks that guarantee clock synchronization for validating the temporal relationship of events, time-based relationships can be effectively used for event correlation.

Delay and Internet Protocol (IP) routing mechanisms may introduce event reordering, because event packets may follow different paths to reach their destination. In such networks, the relative ordering of the events is no longer guaranteed. For networks that guarantee bounded time delays and guarantee correct event ordering, then the concept of progressive patterns for event correlation can be used.

However, many networks have desynchronized sub-network behavior, uncontrollable delays, and event reordering. For these networks, approaches based on temporal relationships and progressive patterns are no longer useful; other mechanisms are needed to evaluate and diagnose network behavior.

In some approaches, dependencies among symptoms and diagnoses are captured through policies. Policies express a logical diagnosis under known conditions of topology, event delivery, and network transport properties. As topology (or configurations of the logical interactions) may also change, the mapping rules of symptoms and diagnosis must be revised.

A network diagnosis is a possible hypothesis about faulty components in the network. A diagnosis may be passive or active. Model-based passive diagnosis systems collect information and analyze it. Many approaches have been used to analyze information, e.g., Bayesian networks, Petri Nets, artificial Neural Networks, rule-based methods, model-based networks, etc. Active diagnosis systems apply additional tests to the results of the passive diagnosis.

Diagnosing network problems is a very time-consuming activity. Therefore, having performance-oriented knowledge-based methods and mechanisms to speed-up the diagnosis would be beneficial.

In one class of prior approaches to this problem, topology-dependent and model-based correlation and diagnosis processes, using root-cause analysis, have been implemented. For example, InCharge from Smarts, NetCool from Micro-Muse, and OpenView from Hewlett-Packard implement these approaches. These solutions are mainly based on dependency models and topology definition and discovery of network elements and/or applications. These mechanisms are intended for out-of-the-box processing and require considerable CPU power and memory.

In another approach, network problems, symptoms and diagnoses are defined in a rule-based markup language (RBML). The markup language is also used to define rules that specify when a particular diagnosis is indicated by one or more symptoms. RBML is described in co-pending U.S. application Ser. No. 10/714,158, filed Nov. 13, 2003, of Keith Sinclair et al. RBML is primarily a language and environment in which to execute rules implemented in that language. It is a mechanism that operates on the knowledge of network behavior in the form of a set of rules but it does not impose any specific model of network behavior. With RBML it is not possible to map a set of events to multiple possible diagnoses. RBML does not account for events that may arrive in any order. Further, all events defined in a rule must occur to trigger the action defined in the rule.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
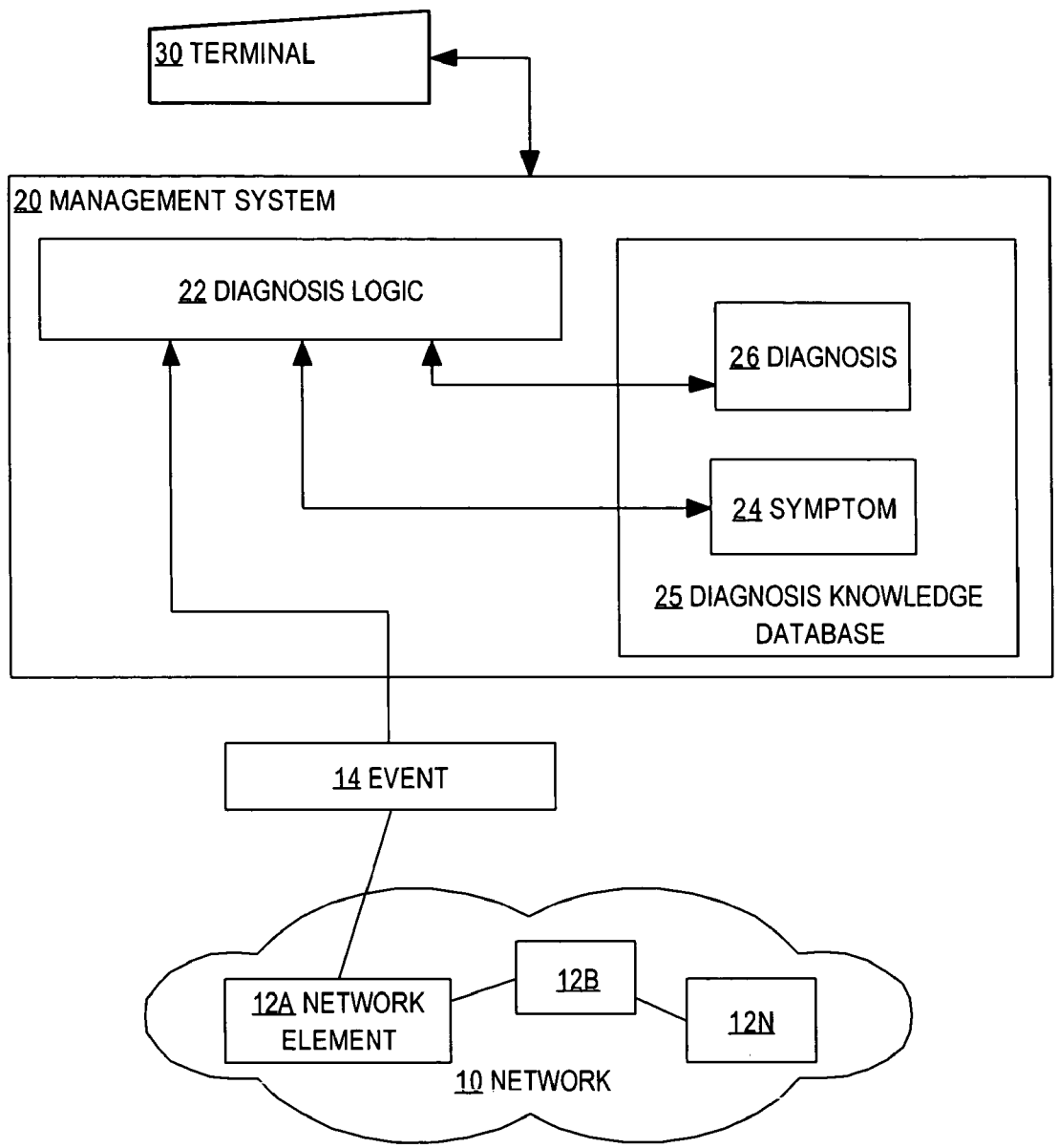
FIG. 1A is a block diagram that illustrates an example network arrangement in which an embodiment may be implemented.

A method and apparatus for generating diagnoses of network problems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural And Functional Overview
   2.1 Network Implementation Example
   2.2 Process For Determining Diagnoses—Process Flows
   2.3 Process For Determining Diagnoses—Symbolic Description
3.0 Examples of Use and Implementation
   3.1 Determining Diagnoses Based on Events
   3.2 Examples of Events and Diagnoses
   3.3 Alternative Approaches To Using Weights
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for network knowledge-based diagnosis comprising the machine-implemented steps of creating and storing one or more symptoms, wherein each symptom comprises a set of information elements that represent one or more network events that may be potentially received from a computer network; associating a weight value with each information element of the one or more symptoms; associating a confidence time interval value with each of the one or more symptoms; receiving one or more network events from network elements in the computer network; and determining a set of one or more candidate diagnoses of a problem indicated by the received network events, by (a) selecting one or more symptoms that include at least one of the received network events and (b) using functions that map the selected symptoms to one or more candidate diagnoses, based on all weight values of events in the selected symptoms and the confidence time interval values of the selected symptoms.

In other aspects, the invention encompasses a computer apparatus and a computer-readable medium configured to carry out the foregoing steps.

According to one embodiment of the techniques herein, a system component, subsystem or system, manifests itself through different events either sent to or polled by a monitoring or management system. Some of the events, which are associated with symptoms, may refer to a problem in the network or system that requires quick diagnosis in order to take the appropriate actions, such as fixing, isolating, replacing, obtaining more information, etc. As used herein, a symptom is a set of one or more events that occur within an associated period of time. A symptom of a network problem may have one or more candidate causes, derived from events that are not necessarily explicitly related. Most diagnostic reasoning applies accumulated experience to apparently unrelated events, resulting in a concrete manifestation of a problem in the system under observation. According to the techniques herein, instead of tightly defining the temporal or relative dependency among events and associating the events and dependencies with diagnoses, a set of events is considered as a snapshot of system's behavior, and potential candidate diagnoses are derived from the set of events. For example, a mapping function can map a set of events to a set of diagnoses. Weight values associated with events, in combination with the mapping function, can map a set of events to a diagnosis even when fewer than all events that definitively indicate the diagnosis have arrived in a given period of time. The resulting candidate diagnoses are associated with a confidence interval value that indicates a time frame in which the candidate diagnoses are valid. The set of candidate diagnoses may be modified over time, when the confidence interval value expires or when other events arrive.

Further, complex diagnoses described by pre-defined combinations of events frequently allow early diagnosis based on a partial subset of the original combination. The techniques herein allow multiple diagnoses to be gradually derived from a given set of events.

The techniques herein can be used for diagnoses that are performed by a management station that is communicatively coupled to a managed network, or within a network element of a managed network. In the latter case, "in-box" event processing can leverage time-based knowledge and ordered events. However, the techniques herein are expected to be most valuable in the former case, in an "out-of-the-box" implementation as part of a complex network, in which temporal aspects and guaranteed ordering are likely to be impossible.

According to one embodiment, a set of candidate diagnoses is associated with a set of events. Events are considered to indicate, and are correlated with, symptoms of network problems. A diagnosis is a conclusion based on the facts that leads to fix an observed problem. The set of diagnoses is insensitive to network delays, or the arrival order of events, and does not require an explicit relationship between events, such as a temporal, sequential, topological, or causal event relationship. A weight value is associated with each of the events. Based on the weights, a particular diagnosis may be selected as the best diagnoses among the candidate diagnoses, even though not all of the events within a set have occurred. A confidence time interval value is associated with the set of events. During the confidence time interval value, the association of the events and the candidate diagnoses is valid.

Thus, when apparently unrelated symptoms occur in a bounded period of time, the symptoms are deemed to be related by one or more candidate diagnoses. Further, not all symptoms in a set must have occurred in the specified time window for one or more diagnoses to be possible. The techniques herein provide a diagnostic mechanism that does not require special event processing, testing, or complex inference mechanisms.

Embodiments are particularly useful in distributed network environments, in which events may arrive at a diagnostic system from different components with no possibility for local correlation. For example, an inventory component, a fault component, and a performance measurement component each may issue different events. These components may use different topological views, network models, and processing mechanisms. Using the techniques herein, these dissimilarities are hidden.

Unlike prior approaches, the techniques herein may be used with networks that experience event delivery delays and event reordering. The techniques allow use of multiple event sets, with no explicit relationship with respect to time, sequence, or topology. The techniques may use event sets of variable length, with indexes and a confidence interval value. Multiple-diagnosis logic is provided, based on event index and confidence interval values. An event set may be extended by union. The relative position of events within the set is irrelevant. The diagnosis mechanism is triggered by the logic associated with the index values. In this context, an index value indicates a position at which a given diagnosis is listed at in a set of candidate diagnoses. The logic provides a means to associate the existing events to the diagnoses that are at an early position, with a lower index value, in a set of candidate diagnoses. The position in a set of diagnoses is correlated with the length of the confidence interval. Thus, for an interval less than the confidence interval, the system can identify the most probable subset of diagnoses.

2.0 Structural and Functional Overview 2.1 Network Implementation Example

FIG. 1A is a block diagram that illustrates an example network arrangement in which an embodiment may be implemented. A network 10 comprises one or more network elements 12A, 12B, 12N that are interconnected for network communication using one or more communication links. The links may be wired, wireless, infrared, or satellite links and may use any of a plurality of communication protocols for the organized exchange of information. Each network element 12A, 12B, 12N comprises a router, switch, or other element of network infrastructure. For purposes of illustrating a simple example, network 10 is shown with three network elements; however, in a practical implementation of the techniques herein, any number of network elements may be used.

Each network element 12A, 12B, 12N periodically or asynchronously emits one or more events 14. Events may be emitted at any time as specified by an operating system or application program executed by the network elements. For example, in one embodiment, an event 14 is emitted by a network element 12A when the network element detects a condition such as failure of a link or interface. Often, but not always, event 14 is associated with an anomalous condition of the network element 12A.

A management system 20 is communicatively coupled to network 10 for purposes of monitoring, configuring, or otherwise managing the network. In one embodiment, management system 20 comprises diagnosis logic 22 that receives events 14 and transforms the events into symptoms 24 and at least one diagnosis 26. Diagnosis logic may comprise one or more sequences of instructions that implement the processes described herein. The symptoms 24 and diagnoses 26 may be stored in a diagnosis knowledge database 25.

A user terminal 30 may be communicatively coupled to management system 20 using an appropriate terminal or console interface. A user such as a network administrator may provide instructions to management system 20 as described herein, such as selecting a particular diagnosis 26 from among two or more candidate diagnoses.

Figure 1B:
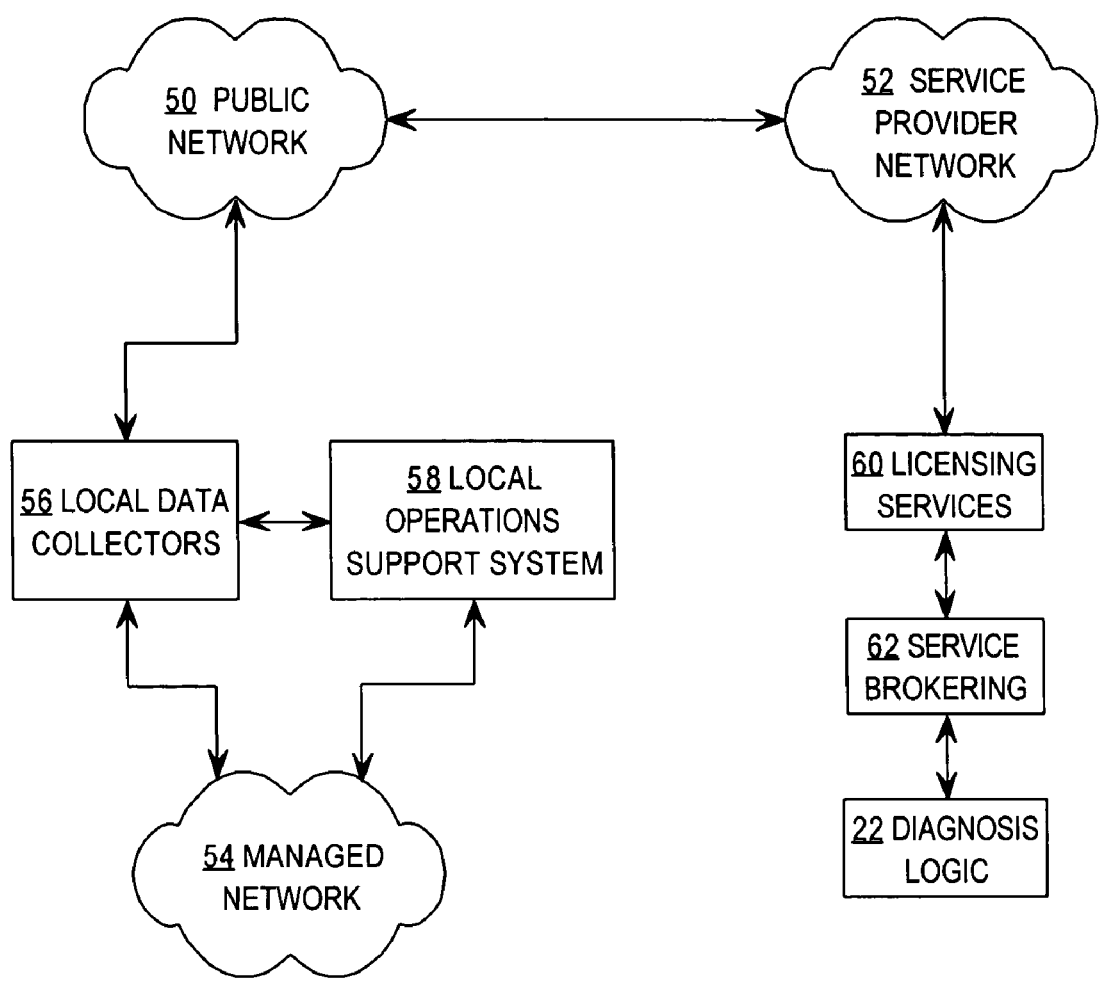
FIG. 1B is a block diagram that shows a distributed implementation of an example embodiment of a system for determining network diagnoses.

FIG. 1A shows an example embodiment in which diagnosis logic 22 is within a management system 20. In an alternative embodiment, diagnosis logic 22 may be positioned within any one or more of network elements 12A, 12B, 12N. Additionally or alternatively, diagnosis logic 22 may provide input to a processing engine, such as an expert system, to process different symptoms in other ways. In still another embodiment, diagnosis logic 22 is integrated with a network element data collector or listener. Diagnosis logic 22 also may be co-located with other mechanisms requiring additional information on network inventory or A system implementing the techniques herein can be used to generate a revenue stream for a network vendor, based on performing network diagnosis and event correlation services. FIG. 1B is a block diagram that shows a distributed implementation of an example embodiment of a system for determining network diagnoses. A managed network 54 comprising one or more network elements has one or more local data collectors 56 that collect data from the network elements and provide the data to a local operations support system (OSS) 58 that manages the managed network. The local data collectors 56 are coupled to a public network 50, such as the Internet, through a firewall or other appropriate security services. Accordingly, data collected by the data collectors 56 is accessible through the public network 50.

Diagnosis logic 22 is hosted within a service provider network 52 and is coupled to a service brokering component 62 and licensing services 60. The service provider network 52, service brokering component 62 and licensing services 60 are owned and operated by a service provider that is separate from the owner or operator of managed network 54. For example, the service provider network 52 may be associated with a network vendor that manufactures or sells elements for the managed network 54.

Diagnosis logic 22 receives events from local data collectors 56 through public network 50 and service provider network 52. Diagnosis logic 22 performs identification of diagnoses in the manner described herein. A representative of an owner or operator of the managed network 54, such as a network administrator who is using OSS 58, can retrieve the diagnoses from diagnosis logic 22 and its diagnosis knowledge database. Further, diagnosis logic 22 can service more than one managed network 54 of different entities in this manner. This arrangement enables multiple independent enterprises having managed networks to obtain the benefit of the larger base of experience and knowledge embodied in the diagnosis knowledge database of diagnosis logic 22. The service provider can charge a fee for access to the diagnosis logic 22, directly or indirectly through licensing services 60 and service brokering component 62. For example, in this arrangement, pre-processed symptoms are combined with other events, as specified in the symptom definition, and an appropriate diagnosis is derived. Multiple sets of weight values may be maintained for each enterprise that is associated with a managed network 54. Thus, the weight values associated with the symptom events and applied by diagnosis logic 22 may vary from one operator of a managed network 54 to another, and can be subject of symptom versioning approaches.

2.2 Process for Determining Diagnoses—Process Flows

Figure 2A:
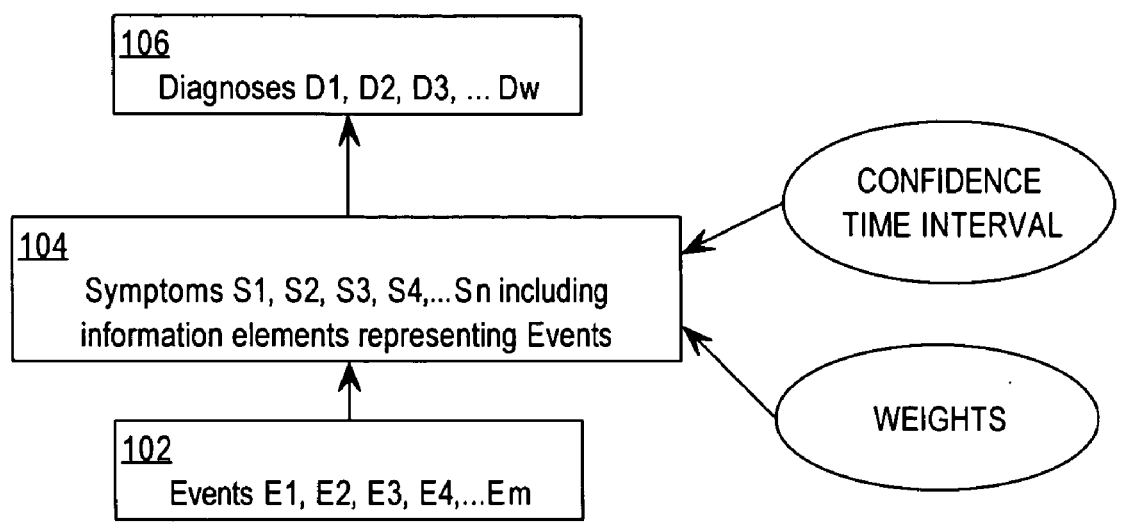
FIG. 2A is a flow diagram that illustrates a high level overview of one embodiment of a process of transforming events from network elements into diagnoses of network problems.

FIG. 2A is a flow diagram that illustrates a high level overview of one embodiment of a process of transforming events from network elements into diagnoses of network problems. As shown in step 102, events $e_1, e_2, \ldots e_m$ arrive at a management system from a network element. At step 104, the events are correlated into symptoms of network problems, designated $s_1, s_2, \ldots s_n$. At step 106, the symptoms are used to determine one or more candidate diagnoses $d_1, d_2, \ldots d_w$.

Figure 2B:
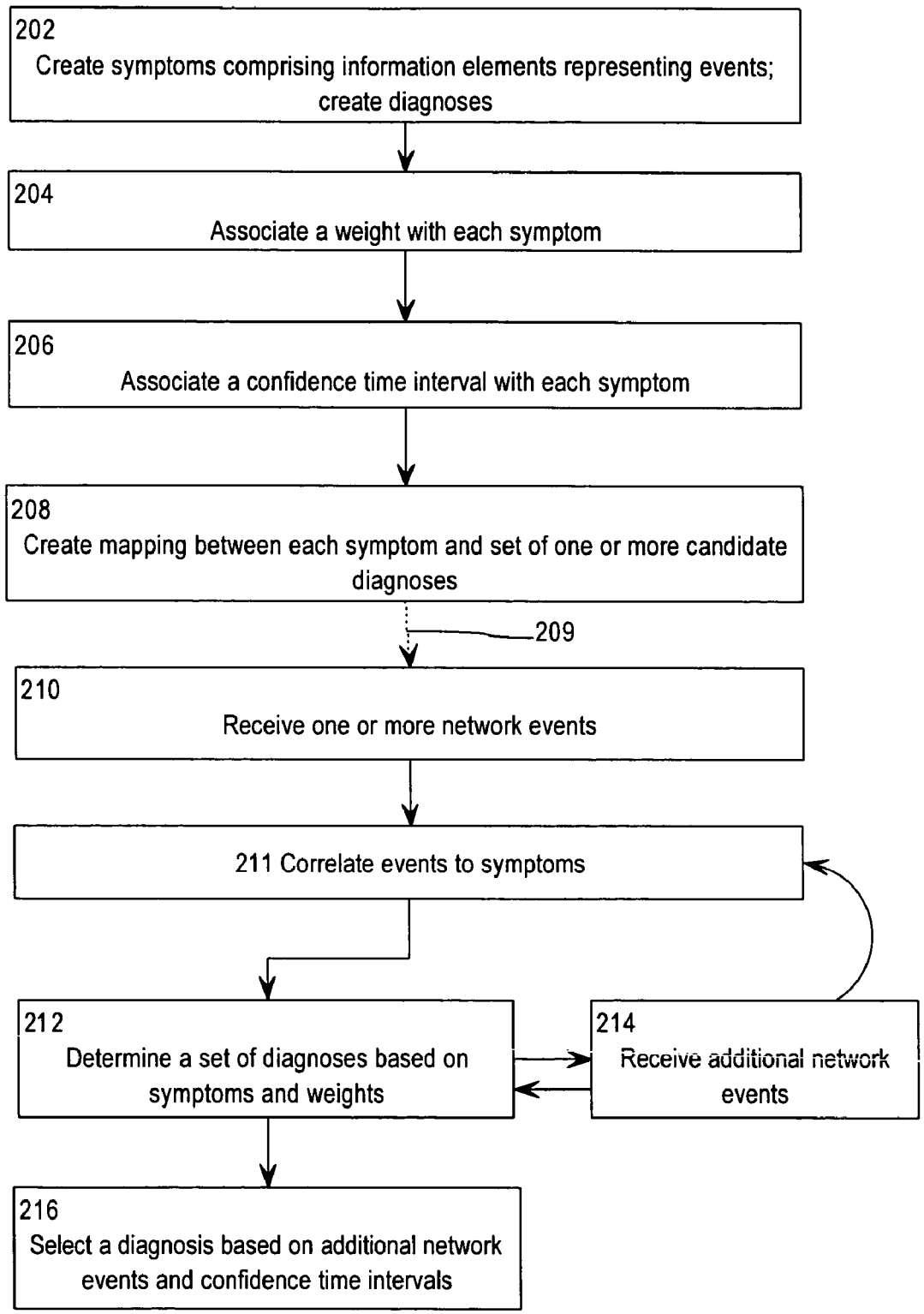
FIG. 2B is a flow diagram of a process of transforming events from network elements into diagnoses of network problems.

FIG. 2B is a flow diagram of a process of transforming events from network elements into diagnoses of network problems. Steps 202-208 represent pre-processing steps that are performed to establish a framework for evaluating events that are received at step 209 and processed at step 210 and later steps. In step 202, one or more symptoms, each having information elements representing events, are created, and one or more diagnoses are created. Step 202 may be performed using manual steps to configure a database or table of symptoms and potential diagnoses, based on the accumulated knowledge and experience of a network administrator, vendor, or other information source.

In step 204, a weight value is associated with each information element of a symptom. Thus, each event becomes weighted in a manner indicating the relative importance of that event to a symptom. The use of weights is described further in other sections below. In step 206, a confidence time interval value is associated with a set of one or more symptoms. Generally, a confidence time interval value specifies a period of time during which a set of events is validly regarded as indicating a symptom. The use of a confidence time interval is described further below.

In step 208, a mapping among symptoms and diagnoses is created. The mapping of step 208 associates each symptom with a set of zero or more potential diagnoses, thereby establishing a baseline set or "universe" of diagnoses for further refinement using the techniques herein. The mapping of step 208 may associate a set of two or more symptoms with zero or more diagnoses. The mapping of step 208 may be created manually based on the accumulated knowledge and experience.

Thereafter, immediately or after the passage of any period of time, as indicated by the broken line of arrow 209, one or more network events are received at step 210. For example, in the context of FIG. 1, network element 12A emits event 14, which is received at management system 20. In step 211, the events are correlated to the symptoms that were defined at step 202. Thus, step 211 involves determining what network symptoms are actually represented by the events by correlating received events to the information elements representing events within the symptoms. In step 212, a set of zero or more diagnoses is determined based on the symptoms and the weights associated with the symptoms.

One or more additional network events may be received at step 214. If so, then the set of diagnoses is updated based on further correlation at step 211 and determination at step 212. In step 216, a primary diagnosis is selected, based on the additional network events and the confidence time interval. The primary diagnosis may be presented to a user for confirmation, with suggested steps for correcting the problem indicated in the diagnosis.

Figure 2C:
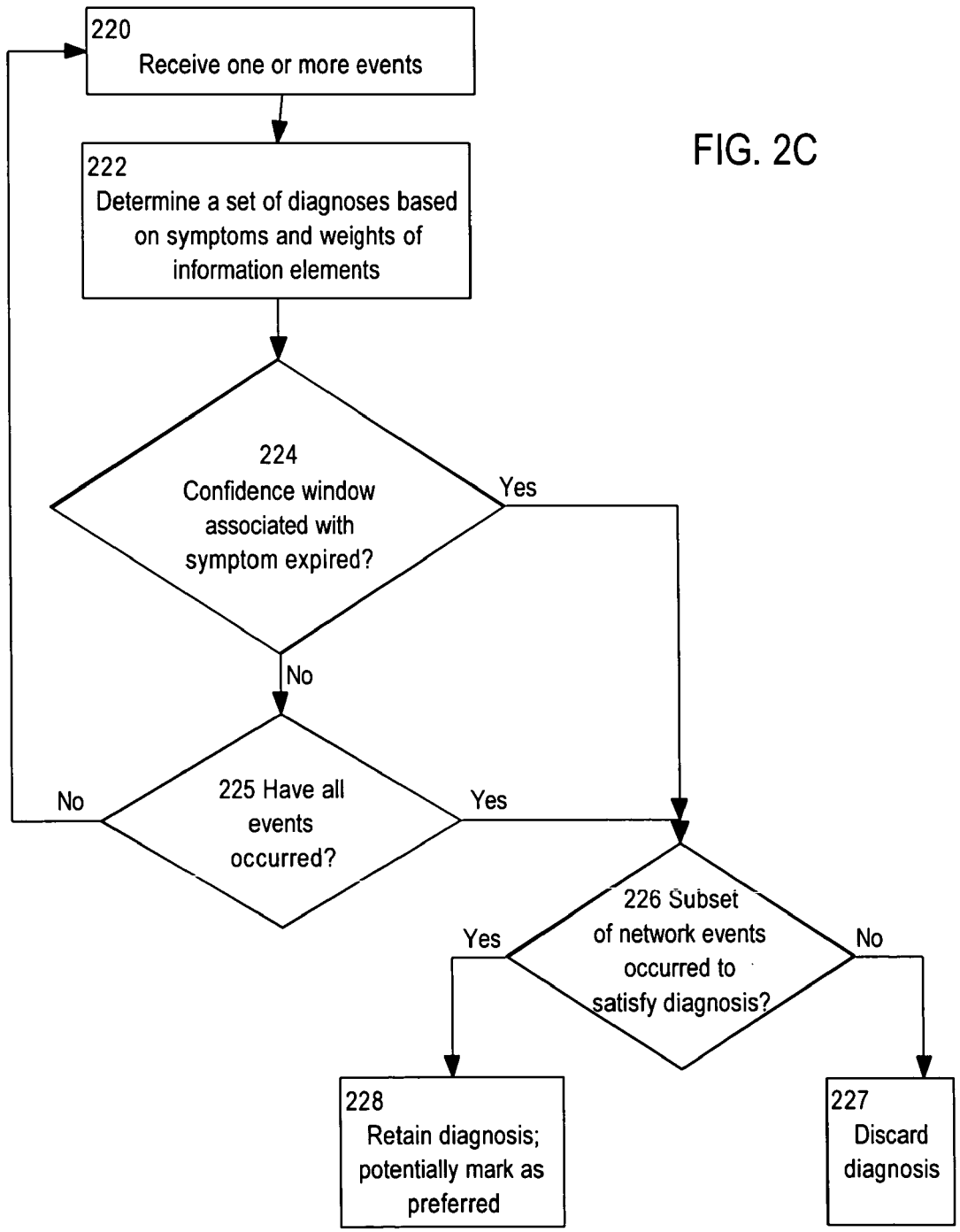
FIG. 2C is a flow diagram of a process of updating diagnoses based on changes in events and confidence time windows.

FIG. 2C is a flow diagram of a process of updating diagnoses based on changes in events and confidence time windows. FIG. 2C thus illustrates in more detail a process that may be used to implement steps 210, 211, 212, and 214 of FIG. 2B.

In step 220, one or more events are received. In step 222, a set of candidate diagnoses is determined, based on a set of symptoms correlated from the events, and weights of information elements representing the symptoms. In step 224, a test is performed to determine if a confidence time interval value, associated with the set of symptoms, has expired. If not, then an additional test is performed at step 225 to determine if all the events in the symptom have occurred. If the result of this test is positive then control passes to step 226. If not, then control returns to step 220 in which the process awaits receiving additional events for processing.

If the confidence time interval for the symptoms has expired at step 224, then in step 226, a test is performed to determine if a sufficient subset of network events has occurred to satisfy one of the diagnoses associated with the set of symptoms. Step 226 involves evaluating each weight value associated with each symptom for an event that was actually received, to determine if the events collectively represent enough weight for a diagnosis to be indicated. If so, then that diagnosis is selected or confirmed as part of the candidate diagnosis set at step 228. If insufficient event weight exists for a particular diagnosis, then that diagnosis is removed from the candidate set at step 227.

2.3 Process for Determining Diagnoses—Symbolic Description

The foregoing process also may be described in symbolic terms as follows. In general, a symptom S is a set of events that can occur in a network, e.g., S={e1, e2, e3, e4}. A set of diagnoses may be associated with each S. For example, if S then {D1, D2}, where D1 could be a memory leak, for example, and D2 is CPU overload. Stated generally, a set of symptoms $\{S_i | i=1 \ldots n\}$ is created in a diagnosis system and each set of symptoms S has an associated set of diagnoses $\{D_j | j=1 \ldots m\}$.

When the events defined for a symptom actually occur in a network having a management system that implements the techniques herein, the associated set of diagnoses is triggered. Each event is associated with a weight value. A weight value indicates the relative importance of a particular event for a defined symptom. Thus, if a first event having a large weight value arrives, and several other events having very low weight values do not occur or are not received, the system can still trigger a potential candidate diagnosis or a set of diagnoses. Accordingly, an indexed symptom may be defined as: $S(k, w_0) = \{e_1/w_1, \ldots e_k/w_k | w_1 + \ldots + w_k = w_0\}$ where K is the maximum number of events considered for the complete series of diagnoses, and $w_0$ is the sum of the weights. The value $w_0$ is used to define the range interval [min $\{w_i\}$, $w_0$] when functions are defined to derive series of diagnoses.

For example, if $w_0=7$, and a function is applied such as f(w>8)-->{D}, no series of diagnoses can be derived because, regardless of the events and the weight distribution, f will always return false. Another use of $w_0$ is that, when re-assigning weights to the events without changing the functions, the distribution must satisfy this constraint; otherwise, the functions must be redefined as well.

Weight values may be determined in several ways. In one approach, the weight values are determined based on expert knowledge, e.g., long-term observation of event occurrences and expert knowledge validation. In yet another approach, weight values are determined using empirical metrics based on past system behavior and successful recommended actions. In another approach, weight values are derived from the information carried by the events themselves. For example, some events carry a severity value or priority tag indicating the importance of that event relative to other events of the same sort. As a specific example, Syslog events, which network elements issue for any behavioral change, normally carry a priority level value of the type shown in Table 1. In one embodiment, the priority level value is automatically adopted as a weight value.

TABLE 1

SYSLOG EVENTS AND PRIORITY LEVELS

| Level name | Level | Description | Syslog definition |
|---|---|---|---|
| Emergencies | 0 | System unusable | LOG_EMERG |
| Alerts | 1 | Immediate action required | LOG_ALERT |
| Critical | 2 | Critical conditions | LOG_CRIT |
| Errors | 3 | Error conditions | LOG_ERR |
| Warnings | 4 | Warning conditions | LOG_WARNING |
| Notifications | 5 | Normal but significant conditions | LOG_NOTICE |
| Informational | 6 | Informational messages only | LOG_INFO |
| Debugging | 7 | Debugging messages | LOG_DEBUG |

In this approach, an event of severity "0" may have the highest weight value $w_i$, while an informational event may have a low weight value.

A diagnosis may have a critical index or critical diagnosis threshold associated with it. For example, in a given system, pre-defined diagnoses may comprise:

D1: f there is a $w_i\{w_i|i=1 \ldots k\}$ and $\{w_i>w_o\}$, where $w_o$ is called critical and D2: if the $w_i$ of the first S events, $w_1+w_2+ \ldots w_S>w_0$, where $w_0$ is a critical diag threshold. Thus, D1 and D2 are a family of diagnoses based on the value of S and $w_0$; for S=1, and $w_0$, diagnosis D1 is indicated.

The use of weighted symptoms helps in reducing the number of candidate diagnoses, and also focuses the derivation process on a particular diagnosis by considering the events that have occurred at a given moment and their weights. Each weight value also may have an associated filtering function. Processing the weight value with the filtering function yields a result indicating the influence of an associated symptom on selection of a diagnosis.

As an example, the occurrence of the event $e_i$ with the weight $w_i$ may lead to a first set of candidate diagnoses, a second set of candidate diagnoses, or no diagnosis, depending on which of two filtering functions are associated with the weight $w_i$. If another event $e_j$ with weight $w_j$ occurs, then yet other sets of diagnoses may be derived.

The techniques herein are intended for use in network environments that do not provide guarantees with respect to delay or ordering among events. Therefore, according to the present techniques, a confidence interval value is associated with each symptom. A confidence interval value refers to a time interval between the first occurrence of an event ($T_x$) of a symptom, in any order, and a time limit specified by the symptom ($T_{max}$). If a specified event occurs, and no condition for an associated diagnosis family is satisfied, then the specified event is discarded after the time $T_{max}-T_x$ elapses, and no diagnosis is available.

Therefore, a complete expression of a symptom may be:

$$S(i,k)[T_{max}]=\{e_1/w_1, \ldots e_k/w_k|w_1+ \ldots +w_k=w_0\}$$

where the confidence interval starts when the first event of the symptom set occurs. First is always the time the event arrives at the receiver.

Figure 3:
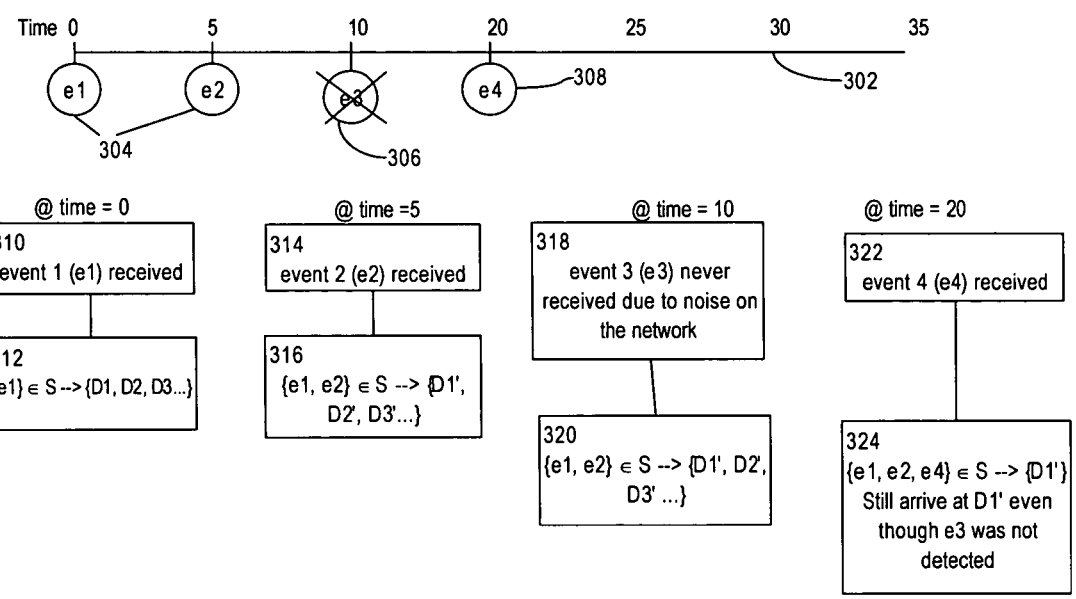
FIG. 3 is a block diagram showing an example transformation of events according to a specified timeline.

3.0 Examples of use and Implementation 3.1 Determining Diagnoses Based on Events FIG. 3 is a block diagram showing an example transformation of events according to a specified timeline. Thus FIG. 3 graphically illustrates one application of the techniques herein. In FIG. 3, a timeline 302 is marked in intervals of 5 seconds and indicates that two events 304 are received at time 0 and time 5, an additional event 306 is emitted by a network element at time 10 but not received by a management system, and a fourth event 308 was received at time 20.

A lower portion of FIG. 3 graphically illustrates updating of a candidate diagnosis set during the passage of time represented by timeline 302. At time 0, in step 310, event e1 is received. As shown in step 312, event e1 is an element of symptom set S, which is mapped to a set of diagnoses D1, D2, D3. At time 5, event e2 is received at step 314. Events e1 and e2 together map to a different set of diagnoses D1', D2', D3', as shown by step 316. At step 318 and time 10, event e3 is emitted but not received at a management system that implements the techniques herein. Therefore, at step 320, no update in the candidate diagnosis set occurs.

At step 322 and time 20, event e4 is received. Events e1, e2, e4 collectively map to diagnosis D1'. Thus, the process may result in selecting diagnosis D1' even though event e3 was not received.

Figure 4:
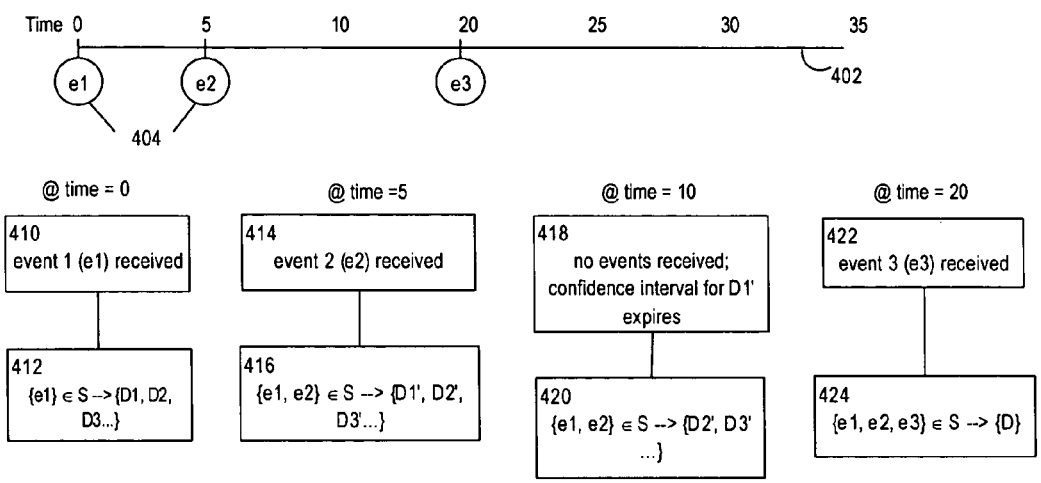
FIG. 4 is a block diagram showing a second example transformation of events according to a specified timeline.

FIG. 4 is a block diagram showing a second example transformation of events according to a specified timeline. As in FIG. 3, a timeline 402 indicates a progression of receiving events e1, e2, e3 at times 0, 5, 20. At step 410, a first event e1 is received at time 0, for example, from a network element. Event e1 corresponds to a symptom set S that maps to a set of candidate diagnoses D1, D2, D3. At step 414, a second event e2 is received at time 5. The symptom set is updated to include e2, and maps to a different set of candidate diagnoses D1', D2', D3' because of the influence of the new event e2.

A plurality of confidence interval values are respectively associated with diagnoses D1', D2', D3'. For example, assume that the confidence interval value for diagnosis D1' is five seconds. Then, at time 10, the confidence interval for D1' expires, and no additional events have been received, as indicated in step 418. Because the confidence interval has expired, the set of candidate diagnoses is updated to remove D1', as shown in step 420.

At time 20, a third event e3 is received, as shown in step 422. In step 424, the event e3 is added to the symptom set, and the set of three symptoms e1, e2, e3 then maps to one candidate diagnosis D. Alternatively, if event e3 never arrived, then the candidate diagnosis set would remain unchanged. In that case, a management application could present diagnoses D2', D3' of step 420 to a user for further evaluation.

Thus, using the techniques herein, a series of sets of candidate diagnoses are developed over time based on received events, mappings of sets of symptoms to candidate diagnoses, and confidence interval values associated with the candidate diagnoses. As a result, candidate diagnoses can be developed without regard to the order in which events are received, the time at which events are received, or whether all events associated with a particular network problem are received. Further, each candidate diagnosis has a bounded period of validity so that if too much or too little time passes, or additional events arrive, the candidate diagnosis may be added or removed.

3.2 Examples of Events and Diagnoses

As a first example, the techniques herein may be used to diagnose a memory leak in a network element. A memory leak occurs in a network element when a software process hosted by the element requests or allocates memory, and then does not free or de-allocate the memory when it is finished with that particular task. As a result, the memory block is reserved until the element is reloaded. Over time, the process allocates and fails to release more memory blocks, until there is no free memory available. Depending on the severity of the memory leak, an administrator has only one option, which is to reload the router.

As a memory leak occurs, a network element could emit the following events:

e1: "device free memory<threshold1"
e2: "device free memory<threshold2"; threshold2<threshold1
e3: "device free memory<threshold3"; threshold3<threshold2<threshold1
e4(i): "holding memory process p(i)<active>" for all i=1, 2, . . . N
e5(i): "holding memory of p(i)>Mem(i)", where p is a process
e6: "holding memory >threshold_a"
e7: "holding memory >threshold_b"; threshold_b>threshold_a The foregoing events may comprise a symptom set S and may have the following weight values: S={e1/1, e2/2, e3/3, e6/1, e7/2, e4(1)/1, e4(2)/1, e4(3)1, e5(1)/4, e5(2)/4, e5(3)/4, e6/10, e7/15}.

An administrator or knowledge worker using the techniques herein may have pre-defined the following diagnoses:

| | |
|---|---|
| {e1/1}& { $w_i$> 10} | → D1: there is a memory leak for process p1 |
| | → D2: there is a memory leak for process p2 |
| | .... |
| | → Dn: there is a memory leak for process pN |
| {e1/1, e4(2)/1} {$w_i$>3} | |
| | → D1': there is a memory leak for some processes and p2 could be one of them |
| | ... |
| {e7/15}& { $w_i$> 10} | → D": big memory leak; reload the router |
| {e4(1)/1, e4(2)/1, ....e4(N)/1} & { $w_i$ > 10}, | → D": big memory leak; reload the router |

As events e1 through e7 arrive at a management system, using the techniques herein, the management system progressively identifies diagnoses D1, D2, D1, D".

As another example, an inventory change diagnosis may be determined based on the following network element events.

e1=an event from an element that some hardware has been removed;
e2=an event that specifies the loss of connectivity;
e3=an event reporting the inventory on an element has changed;
e4=an event reporting a set of customers being disconnected;
e5=an event reporting a degradation of SLA conditions in a network area.

Events e1, e2, e3, e4, e5 may be received by a monitoring application with delays, and in any order. Information carried in the payload of the events may be used to select and associate a symptom with each event, based on device identifiers, inventory status, customers associated, degraded parameters of a service level agreement, and other information in the payload. The resulting selected symptoms are grouped into a set S=(e1, e2, e3, e4, e5). A weight or relevance value W is associated with each event. The weighted symptom set may be expressed as: S (i, 5)={e1/3, e2/3, e3/1, e4/4, e5/2|W=3+3+1+4+2=13}

A confidence time interval value is associated with to the symptom set, yielding the expression: S (i, 5) [first, $T_{max}$] ={e1/3, e2/3, e3/1, e4/4, e5/2|W=3+3+1+4+2=13}, where "first" represents a timestamp of the first event in the set, and "$T_{max}$" represents a duration of time in which the symptoms are considered valid for deriving a diagnosis. The time of arrival of the first event to arrive at the event receiver is selected as "first" in all cases, because the system clocks of the receiver and the network elements are typically not synchronized. The confidence time interval value is useful because events occurring within the confidence time interval may trigger a series of diagnostics that are different from those triggered if the same series of events occurs outside the confidence time interval. Therefore, in the present approach, the confidence time interval differentiates between types of A diagnosis, D1, with W greater than or equal to 5, may mean that the received events in S include either e1 and e2, or e1 and e5, or e2 and e4, or e3 and e4, etc., as the minimal sets of event occurrences before the D1 diagnosis can be derived. A different diagnosis, D2, may be defined of having W greater or equal than 12.

3.3 Alternative Approaches to Using Weights

The use of weights herein is one example of how network knowledge can be combined in an algorithmic way to map events or symptoms to specific diagnoses. At least two alternative approaches are contemplated. In one alternative approach, associations for event clustering are used. This implementation method defines a clustering set of functions over a given set of events. Thus, a clustering model is defined and the model maps to a series of diagnoses.

For example, assume that S={e1, e2, e3, e4, e5} and {F} is a clustering function mapping S to a family of diagnoses {D}. In this approach possible function definitions could include:

f1[S](e1, e3, x)-->D1, with x being any of the remaining events in S f2[S](e1, e2, e3, x)-->D2, with x being any of the remaining events in S, where f1 and f2 are functions in {F} defined over the event space S. Additionally, function definitions could comprise:

f1[S](e1, e2, y)-->D1', with y not being in S
f2[S](e1, e2, e3, y)-->D2', with y not being in S.

A confidence interval is associated with each function. The same function with a different confidence interval can define a different diagnosis.

In a second alternative, genetic algorithms are leveraged. In this alternative, the evolutionary processing provided by genetic algorithms is used to progressively determine diagnoses. For example, a fitness function specifies identifies which events in a set of events are sufficient to lead to a given diagnosis. A poor fitness function may result in a wrong diagnosis. Therefore, a function that offers the smallest deviation in triggering the right diagnosis should be defined.

As a further alternative to the use of a fitness function, other methods may be used to select events belonging to a particular diagnosis. Examples of such methods are fitness-proportionate, rank, tournament, steady state, and random selection. In one embodiment, a selection method is chosen depending on whether convergence to a sub-optimal diagnosis is acceptable. For example, if having multiple diagnosis candidates from a series is acceptable, as opposed to continuing to wait for all the events to occur for a unique and precise diagnosis, then a different method could be chosen. The use of weighting as described herein is an example of the "rank" method.

As an example, assume that a set of events S={e1, e2, e3, e4, e5}. Assume that events e1 and e3 are parental events used to derive a series of diagnoses and build the next expected generation of diagnoses inheriting the {e1, e3} subset. A crossover method, e.g., single point, multipoint, or uniform is used to randomly select a new coming event (or subset of events) and define an appropriate diagnosis. For example, if {e2, e4}, {e2, e5} and {e2, e4, e5} are subsets, then:

{e1, e3} & {e2, e5}-->D1
{e1, e3} & {e2, e4}-->D2
{e1, e3} & {e2, e4, e5}-->D3

If D3 is not validated, then the consequences of the genetic algorithm are applied. For example, a probability $P_{31}$ of mutation towards D1 (i.e., loss of the event e4, or delay longer than the confidence interval for the event e4), or $P_{32}$ for a mutation towards D2 (lost of the event e5, or delay longer than the confidence interval for the event e5), is applied. When the mutation probability exceeds a given threshold, the diagnosis may be modified. Thus, for example, WHEN P31>threshold
THEN {e1, e3} & {e2, e5}-->{D1, D3}

4.0 Implementation Mechanisms—Hardware Overview

Figure 5:
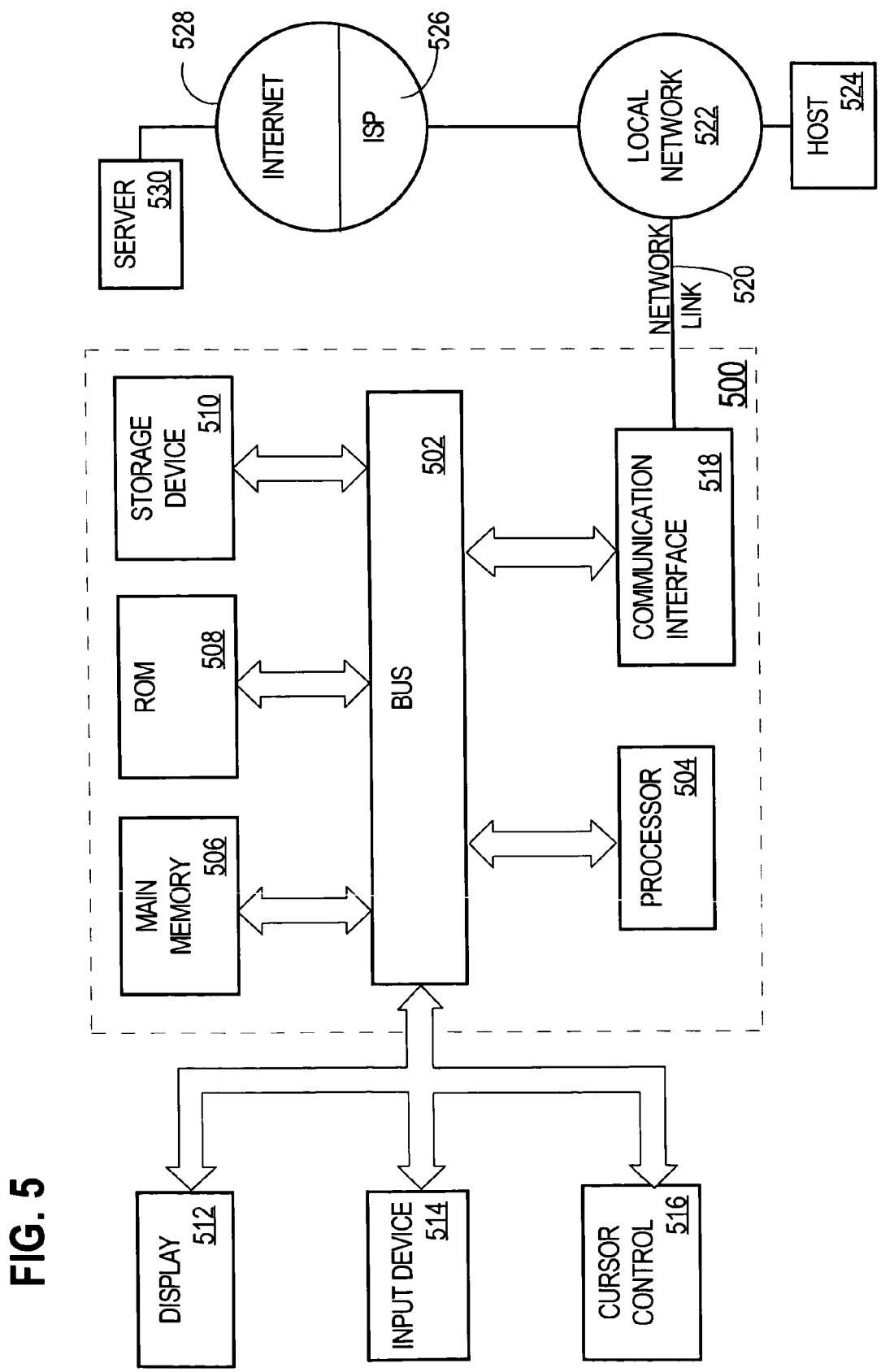
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for generating diagnoses of network problems. According to one embodiment of the invention, generating diagnoses of network problems is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for generating diagnoses of network problems as described herein.

Processor 504 may execute the received code as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for network knowledge-based diagnosis comprising the machine-implemented steps of:

creating and storing one or more symptoms, wherein each symptom comprises a set of information elements that represent one or more network events that may be potentially received from network infrastructure devices in a computer network;

associating a weight value with each information element of the one or more symptoms;

associating a confidence time interval value with each of the one or more symptoms;

receiving one or more network events from the network infrastructure devices in the computer network; and determining a set of one or more candidate diagnoses of a problem indicated by the received network events, by (a) selecting one or more symptoms that include at least one of the received network events and (b) using functions that map the selected symptoms to one or more candidate diagnoses, based on all weight values of events in the selected symptoms and the confidence time interval values of the selected symptoms;

storing the set of one or more candidate diagnoses of a problem indicated by the received network events.

2. A method as recited in claim 1, further comprising selecting a primary diagnosis from the set of diagnoses, based on repeating the determining step after receiving one or more additional network events occurring within the confidence time interval of a symptom.

3. A method as recited in claim 1, further comprising the step of receiving one or more additional network events, and in response thereto, determining a new set of one or more candidate diagnoses.

4. A method as recited in claim 1, further comprising discarding a specific diagnosis from the said set of one or more candidate diagnoses when the confidence time interval associated with the selected symptoms have expired and no additional network events included in the selected symptoms have been received.

5. A method as recited in claim 1, wherein determining said set of one or more candidate diagnoses comprises:

receiving one or more first network events within the confidence time interval that is associated with one selected symptom;

determining a first set of candidate diagnoses;

selecting a primary diagnosis from said first set of diagnoses wherein said primary diagnosis has been satisfied by receiving a subset of one or more network events for the one selected symptom that corresponds to said first diagnosis.

6. A method as recited in claim 1, wherein the weight values are determined based on a network administrator's accumulated knowledge about relative importance of events to symptoms and diagnostics.

7. A method as recited in claim 1, wherein the weight values are derived automatically from information within the network events.

8. A method as recited in claim 1, wherein the weight values are derived using empirical metrics based on past system behavior and successful diagnosis.

9. A method as recited in claim 1, wherein the information elements included in the symptoms are determined based on a network administrator's knowledge about relative importance of events to symptoms and diagnostics.

10. A method as recited in claim 1, wherein the information elements included in the symptoms are derived from information within the network events.

11. A method as recited in claim 1, wherein the information elements included in the symptoms are derived using empirical metrics based on past system behavior and successful diagnosis.

12. A method as recited in claim 1, wherein each confidence time interval value for the symptoms represents an interval of time between a first occurrence of a network event and a limit associated with that symptom.

13. A method as recited in claim 12, wherein the limit associated with that symptom is a maximum time period for which that symptom corresponding to the set of candidate diagnoses can be satisfied.

14. A computer apparatus as recited in claim 1, wherein the execution of the one or more sequences of instructions by one or more of the processors further causes one or more of the processors to perform selecting a primary diagnosis from the set of diagnoses, based on repeating the determining step after receiving one or more additional network events occurring within the confidence time interval of a symptom.

15. A computer apparatus as recited in claim 1, wherein the execution of the one or more sequences of instructions by one or more of the processors further causes one or more of the processors to perform receiving one or more additional network events, and in response thereto, determining a new set of one or more candidate diagnoses.

16. A computer apparatus as recited in claim 1, wherein the execution of the one or more sequences of instructions by one or more of the processors further causes one or more of the processors to perform discarding a specific diagnosis from the said set of one or more candidate diagnoses when the confidence time interval associated with the selected symptoms have expired and no additional network events included in the selected symptoms have been received.

17. A computer apparatus as recited in claim 1, wherein the execution of the one or more sequences of instructions by one or more of the processors further causes one or more of the processors to perform:
- receiving one or more first network events within the confidence time interval that is associated with one selected symptom;
- determining a first set of candidate diagnoses;
- selecting a primary diagnosis from said first set of diagnoses wherein said primary diagnosis has been satisfied by receiving a subset of one or more network events for the one selected symptom that corresponds to said first diagnosis.

18. A computer apparatus as recited in claim 1, wherein each confidence time interval value for the symptoms represents an interval of time between a first occurrence of a network event and a limit associated with that symptom.

19. A machine-readable medium carrying one or more sequences of instructions wherein execution of the one or more sequences of instructions by one or more processors causes the one or more processors to perform the steps of:
- creating and storing one or more symptoms, wherein each symptom comprises a set of information elements that represent one or more network events that may be potentially received from network infrastructure devices in a computer network;
- associating a weight value with each information element of the one or more symptoms;
- associating a confidence time interval value with each of the one or more symptoms;
- receiving one or more network events from network infrastructure devices in the computer network; and
- determining and storing a set of one or more candidate diagnoses of a problem indicated by the received network events, by (a) selecting one or more symptoms that include at least one of the received network events and (b) using functions that map the selected symptoms to one or more candidate diagnoses, based on all weight values of events in the selected symptoms and the confidence time interval values of the selected symptoms.

20. A computer apparatus comprising:
- one or more processors; and
- a memory coupled to one or more of the processors, the memory containing one or more sequences of instructions for network knowledge-based diagnosis, wherein execution of the one or more sequences of instructions by one or more of the processors causes one or more of the processors to perform:
- creating and storing one or more symptoms, wherein each symptom comprises a set of information elements that represent one or more network events that may be potentially received from network infrastructure devices in a computer network;
- associating a weight value with each information element of the one or more symptoms;
- associating a confidence time interval value with each of the one or more symptoms;
- receiving one or more network events from network infrastructure devices in the computer network; and
- determining and storing a set of one or more candidate diagnoses of a problem indicated by the received network events, by (a) selecting one or more symptoms that include at least one of the received network events and (b) using functions that map the selected symptoms to one or more candidate diagnoses, based on all weight values of events in the selected symptoms and the confidence time interval values of the selected symptoms.

21. An apparatus for network knowledge-based diagnosis, comprising:
- a means for creating and storing one or more symptoms, wherein each symptom comprises a set of information elements that represent one or more network events that may be potentially received from network infrastructure devices in a computer network;
- a means for associating a weight value with each information element of the one or more symptoms;
- a means for associating a confidence time interval value with each of the one or more symptoms;
- a means for receiving one or more network events from network infrastructure devices in the computer network; and
- a means for determining and storing a set of one or more candidate diagnoses of a problem indicated by the received network events, by (a) selecting one or more symptoms that include at least one of the received network events and (b) using functions that map the selected symptoms to one or more candidate diagnoses, based on all weight values of events in the selected symptoms and the confidence time interval values of the selected symptoms.

* * * * *